US012710537B2

(12) United States Patent
Hsu

(10) Patent No.: US 12,710,537 B2
(45) Date of Patent: Aug. 18, 2026

(54) WATERCRAFTS ENVIRONMENT RISK REAL-TIME CONTROL AND NAVIGATION SYSTEM AND ITS OPERATION METHOD

(71) Applicant: SHIP AND OCEAN INDUSTRIES R&D CENTER, New Taipei City (TW)

(72) Inventor: Ming-Hsiang Hsu, New Taipei City (TW)

(73) Assignee: SHIP AND OCEAN INDUSTRIES R&D CENTER, New Taipei City (TW)

( * ) Notice: Subject to any disclaimer, the term of this patent is extended or adjusted under 35 U.S.C. 154(b) by 911 days.

(21) Appl. No.: 18/085,547

(22) Filed: Dec. 20, 2022

(65) Prior Publication Data

US 2024/0201378 A1 Jun. 20, 2024

(30) Foreign Application Priority Data

Dec. 14, 2022 (TW) ................................ 111147973

(51) Int. Cl.
*G01S 17/89* (2020.01)
*G05D 1/00* (2006.01)
*G06T 7/20* (2017.01)

(52) U.S. Cl.
CPC ............ *G01S 17/89* (2013.01); *G05D 1/0875* (2013.01); *G06T 7/20* (2013.01)

(58) Field of Classification Search
CPC ............ G01S 7/89; G05D 1/0875; G06T 7/20
See application file for complete search history.

(56) References Cited

U.S. PATENT DOCUMENTS 6,151,556 A * 11/2000 Allen .............................. 702/18
11,532,168 B2 * 12/2022 Smolyanskiy et al. ...................... G06V 20/584

(Continued)

FOREIGN PATENT DOCUMENTS

CN 104516356 A 4/2015

OTHER PUBLICATIONS

Zhe Chen, Tao Huang, Zhenfeng Xue, Zongzhi Zhu, Jinhong Xu, Yong Liu, "A Novel Unmanned Surface Vehicle with 2D-3D Fused Perception and Obstacle Avoidance Module", International Conference on Robotics and Biomimetics, Dec. 27-31, 2021, pp. 1804-1809, IEEE, Sanya, China.

(Continued)

*Primary Examiner* — Helal A Algahaim
*Assistant Examiner* — Evan H Haut
(74) *Attorney, Agent, or Firm* — Cheng-Ju Chiang

(57) ABSTRACT

The invention provides a real-time control and navigation system for watercrafts environmental risk, which has a processor, a 3D radar, an inertial sensor and a global positioning system (GPS) configured on the watercrafts. The 3D cloud point detected by the lidar sensor is converted into a 2D point cloud, the processor converts the coordinates of the 2D point cloud according to the GPS, and the image algorithm calculates the position of the obstacle according to the real-time condition of the watercrafts detected by the inertial sensor, and then navigate the path of the watercrafts. The present invention can improve the position accuracy of the obstacles on the water, and the path navigation also improves the safety of the route by considering the required margin for the running of the watercrafts itself.

8 Claims, 2 Drawing Sheets

10

(56) References Cited

U.S. PATENT DOCUMENTS

| | | | | |
|---|---|---|---|---|
| 2020/0034620 | A1* | 1/2020 | Lutterodt | G06K 9/00 |
| 2022/0176827 | A1* | 6/2022 | Otanez et al. | B60L 15/20 |
| 2023/0111122 | A1* | 4/2023 | Su et al. | G05D 1/0274 |
| 2023/0177719 | A1* | 6/2023 | Babin et al. | G06T 7/74 |

OTHER PUBLICATIONS

Binghua Shi, Yixin Su, Huajun Zhang, Jiawen Liu, Lili Wan, "Obstacles Modeling Method in Cluttered Environments Using Satellite Images and Its Application to Path Planning for USV", International Journal of Naval Architecture and Ocean Engineering, May 3, 2018, pp. 202-210, vol. 11, Elsevier B.V.

* cited by examiner

10

WATERCRAFTS ENVIRONMENT RISK REAL-TIME CONTROL AND NAVIGATION SYSTEM AND ITS OPERATION METHOD

TECHNICAL FIELD

With the rapid development and wide application of unmanned vehicles in the future, real-time map and automatic path planning technology used by optical radar for vehicles will be widespread. However, there are currently few cases where optical radar is actually applied to water vehicles. The navigation path of water surface vehicles is a necessary item for the actual operation and maintenance of vehicles. In addition to using 3D optical radar, the present invention reduces the cost of navigator using traditional marine radar and charts for water surface vehicles, and can calculate the navigable path at that time in real time. Highly accurate navigation maps are installed, so it is expected to have a significant impact.

BACKGROUND OF RELATED ARTS

With the evolution of shipbuilding technology, watercraft plays the main tool of ocean transportation. Regardless of whether it is a general watercraft or a self-driving ship (unmanned ship) that has been actively developed in recent years, its navigation control or path correction plays an extremely important role in the navigation process of ocean transportation. How to make the economic benefits brought by watercraft transportation greater and save shipping costs is an important design goal.

Nowadays, only 6% of inland transport travels on waterways, while water transport is actually more energy efficient and safer relative to its rail and road counterparts. Optimized route and fuel efficiency, increased cargo space and savings on human resources are just some of the ways automation helps inland barge owners increase their margins and gain a competitive edge in the transport market.

GPS positioning plays a key role in the navigation of autonomous vessels by providing positioning information such that the ship can navigate safely around the port, stay on a predetermined route and dock at the destination harbor. Inland navigation, where distance between ships can be down to 1 m in a tight space of a lock, demands positioning solutions with the highest positioning accuracy and reliability.

Autonomous barges are monitored by a captain based in a Remote Operating Center who monitors the navigation of several unmanned ships simultaneously, and if needed can intervene to take over navigation control. Unlike open sea transport, inland barges need to navigate narrow waterways which pass through locks, under bridges and near urban areas all of which raise a number of engineering challenges for an accurate and continuous positioning solution.

Narrow inland waterways, lock systems and harbors require boats to navigate with utmost precision, sometimes leaving only a few meters between passing boats. Docking and undocking maneuvers require special attention from the remote captain who monitors the process. In order to judge the situation correctly and if needed to remotely steer the ship, the remote captain needs to know the exact position of the ship down to sub-meter level. However, in addition to the high accuracy requirements, the errors and noise interference encountered by inland waterways are also problems that need to be overcome.

Multipath errors are caused by GPS satellite signals being reflected off nearby structures such as lock walls, bridges, buildings, and other ships. Multipath delays the GPS signals and reduces both the accuracy and reliability of position of the ship. Another factor that affects positioning and its accuracy is GPS satellite visibility.

Jamming is a distortion of the low-powered GPS signals due to interference such as radio waves, cellular communication links, or chirp jammers, which are jamming devices used by drivers to avoid road tolling. Unintentional jamming can also be caused by various devices on board the vessel itself such as radars, radios, antennas, and satellite modems. Interference caused by jamming reduces position accuracy and can even cause a loss of GPS positioning in the radius of hundreds of meters around the interference source.

Heading is the orientation of the ship in the water, which can differ from the velocity vector due to water currents and wind. Only with exact heading information can the remote captain visualize the full length of the ships within the mapping software. Traditional magnetic compass solutions are sensitive to large metal objects in the area and can be affected by locks, bridges as well as other ships passing nearby. More advanced gyrocompass-based solutions are also available and typically more reliable, however are price prohibitive and too costly a component for small barge automation projects. The navigation device such as marine radar, Electronic Navigation Chart (ENC), etc. in traditional island barges or watercrafts have to bigger install space. Although the navigation device such as marine radar, Electronic Navigation Chart (ENC), etc. in traditional island barges or watercrafts can detect more far distance, the accuracy is low and difficult detect small obstacle and ship with low height hull.

SUMMARY

In order to solve the problems mentioned in the prior art, the present invention provides a watercrafts environment risk real-time control and navigation system and its operation method.

The watercrafts environment risk real-time control and navigation system comprises a processor, a 3D radar, an inertial sensor, and a global positioning system (GPS). The processor is configured on a watercraft and connects with the 3D radar, the inertial sensor, and the GPS respectively. The data obtained from the 3D radar, the inertial sensor, and the GPS that be inputted into the processor for calculation. Furthermore, the 3D radar scans the obstacles around watercraft, and gets a 3D point cloud and inputs 3D point cloud into the processor in real time. The GPS feedback a real-time coordinate of the watercraft in the plane navigation coordinate system. The inertial sensor detects a motion of the watercraft and acquires a watercraft motion information and inputs into the processor.

The processor comprises a coordinate transform system, an image processing unit, and a path planning unit. In the coordinate transform system, a projection of the 3D point cloud stacks to form a 2D point cloud. Then, the 2D point cloud is converted into a plane point cloud according to a real-time coordinate of the plane navigation coordinate system. The image processing unit rasterizes the plane point cloud. Thereon, the image processing unit refers to the watercraft motion information to remove noise and optimizes the obstacles via an algorithm and generates a plane navigation map. Finally, the path planning unit calculates an optimal path for the watercraft by the plane navigation map.

The above-mentioned descriptions are only preferred embodiments of the present invention and are not intended to limit the scope of implementation of the present invention. Therefore, all the shapes, structures, features, and spirits described in the scope of the patent application of the present invention shall be regarded as equivalent to the changes and modifications per se, and be included in the scope of the patent application of the present invention.

DETAILED DESCRIPTION OF THE INVENTION

Thereinafter, to make the description of the present disclosure more detailed and complete, the following description provides an illustrative description for the implementation and specific embodiments of the present invention. However, the following description is not the only form of implementing or using specific embodiments of the invention. In these paragraphs, the features of various specific embodiments are covered as well as the method steps and sequences for constructing and operating these specific embodiments. However, the other embodiments may also be utilized to achieve the same or equivalent function and sequence of steps.

Figure 1:
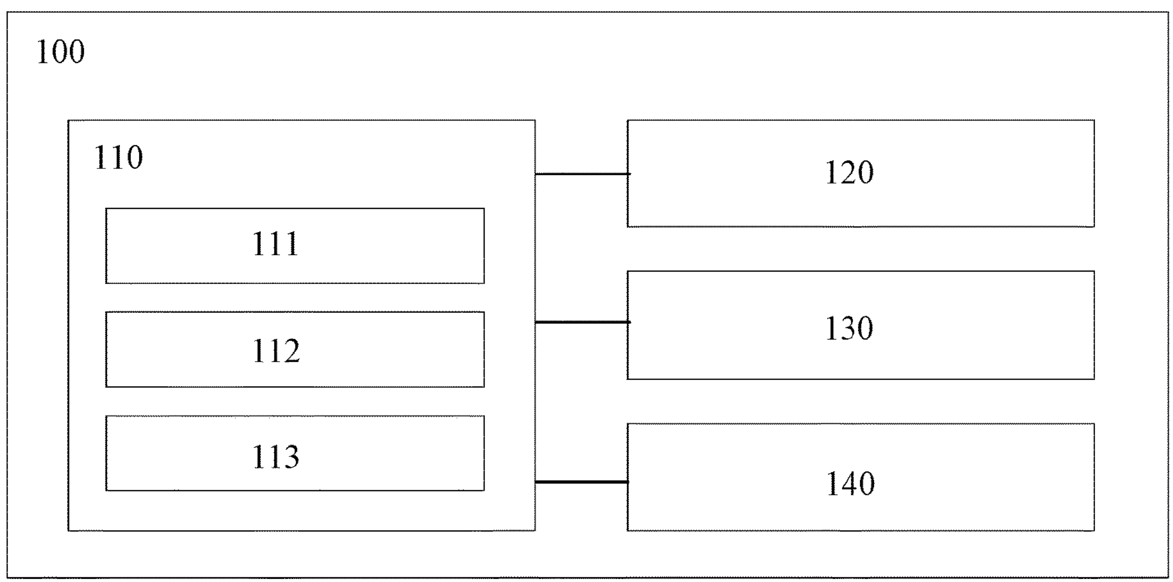
FIG. 1 is a schematic diagram of the system structure of the watercrafts environment risk real-time control and navigation system of the present invention.

First, refer to FIG. 1, FIG. 1 is a schematic diagram of the system structure of the watercrafts environment risk real-time control and navigation system of the present invention.

As shown in FIG. 1, the watercrafts environment risk real-time control and navigation system 10 of this embodiment comprises a processor 110, a 3D radar 120, an inertial sensor 140, and a global positioning system (GPS) 130. The processor 110 is configured on a watercraft 10 and connects with the 3D radar 120, the inertial sensor 140, and the GPS 130 respectively.

Furthermore, in this embodiment, the data obtained from the 3D radar 120, the inertial sensor 140, and the GPS 130 that be inputted into the processor 110 for calculation. The 3D radar 120 scans the obstacles around watercraft 100, and gets a 3D point cloud and inputs 3D point cloud into the processor 110 in real time. The GPS 130 feedbacks a real-time coordinate of the watercraft 100 in the plane navigation coordinate system. The inertial sensor 140 detects a motion of the watercraft 100 and acquires a watercraft motion information and inputs into the processor 110.

In this embodiment, the processor 110 comprises a coordinate transform system 111, an image processing unit 112, and a path planning unit 113. Furthermore, in the coordinate transform system 111, a projection of the 3D point cloud stacks to form a 2D point cloud. Then, the 2D point cloud is converted into a plane point cloud according to a real-time coordinate of the plane navigation coordinate system. The image processing unit 112 rasterizes the plane point cloud and the image processing unit refers to the watercraft motion information to remove noise and optimizes the obstacles via an algorithm and generates a plane navigation map. Finally, the path planning unit 113 calculates an optimal path for the watercraft by the plane navigation map.

In this embodiment, the processor 110 may be a known Central Processor. The 3D radar 120 may be a 16-beam light detection and ranging (LiDAR) sensor such as Velodyne 3D Lidar. Moreover, the GPS 130 may be Trimble GPS. The inertial sensor 140 may be general common inertial sensor.

In this embodiment, the watercraft motion information referred to in this embodiment is known to comprises a heading and a ship motion information. The watercraft motion information comprises 2D motion information. The 2D motion information comprises rolling, pitching, heaving, or combination thereof.

Figure 2:
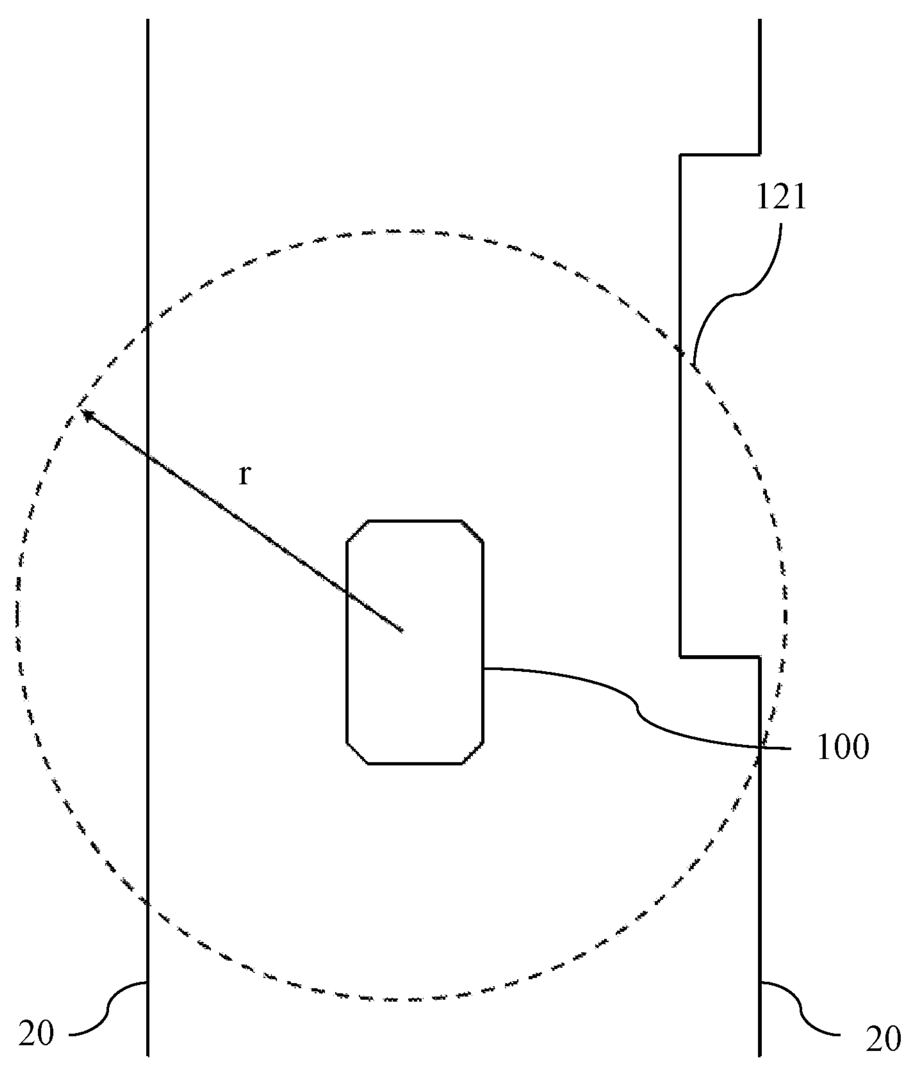
FIG. 2 is a schematic diagram of the watercrafts real-time sailing on the river of the embodiment of the present invention.

FIG. 2 is a schematic diagram of the watercrafts 100 real-time sailing on the river of the embodiment of the present invention. As shown in FIG. 2, a middle area is the river for watercraft 100 sailing that be divided by the left and right riverbank line 20. The left and right side of the area are riverbanks. In FIG. 2, the 3D radar is configured around the watercraft 100 and gets a scanning area 121 when the watercraft 100 is sailing. The scanning area 121 is a circular area formed with radius r. The 3D radar develops a 3D point cloud by real-time detecting data and outputs the 3D point cloud into the processor 110. In the coordinate transform system 111 in the processor 110, a projection of the 3D point cloud stacks to form a 2D point cloud.

Moreover, the real-time coordinate is the real-time geodetic coordinate of watercraft 100, that is the watercraft 100 geodetic coordinate when sampling. In the coordinate transform system 111, the Then, the 2D point cloud is converted into a plane point cloud according to a real-time coordinate of the plane navigation coordinate system. The image processing unit 112 rasterizes the plane point cloud. The rasterize is meant to pixelized the image. Each grid is a pixel. Hence, if there is a point of the 2D point cloud in a grid, this pixel is set to 1. In the other words, if there is not any point of the 2D point cloud in a grid, this pixel is set to 0. The image processing unit 112 converts the above-mentioned plane point cloud image into a digital plane navigation image of n×n. For example, if n is 10, then a 10×10 digital image is obtained.

The image processing unit 112 refers to the watercraft motion information to remove noise and optimizes the obstacles via an algorithm and generates a plane navigation map. The image processing unit 112 also refers the heading and the ship motion information detecting by the inertial sensor 140. In addition, the image processing unit 112 includes the filter module that can perform an erosion operation, a dilation operation, or combinations thereof. Furthermore, the image processing unit 112 includes the preset reference value, the first dilation coefficient, and the second dilation coefficient. The above-mentioned dilation operation refers to the watercraft motion information, and expand the pixel that value is 1. Hence, the algorithm optimized the obstacles that can reduce the opportunity of incorrect for determining the obstacle area to navigation area. The erosion operation can remove noise such as reflective point noise from wave.

If the value of the watercraft motion information is not over the reference value, the image processing unit 112 perform dilation operation to the digital plane navigation image by the first dilation coefficient. If the value of the watercraft motion information is over the reference value, the image processing unit 112 perform dilation operation to the digital plane navigation image by the second dilation coefficient. For example, when the sea state is slight that is the value of the watercraft motion information is smaller than the reference value, the image processing unit 112 perform dilation operation by smaller dilation coefficient. When the sea state is rough, the hull will be more rolling, pitching, heaving. For the safety, the image processing unit 112 perform dilation operation by bigger dilation coefficient.

As the description presents above, the image processing unit 112 refers to the watercraft motion information to remove noise and optimizes the obstacles via an algorithm and generates a plane navigation map. The path planning unit 113 of the processor 110 includes common crafts automatic path planning algorithm such as rapidly exploring random tree. The path planning unit 113 calculates an optimal path using path planning algorithm for the watercraft 100 by the plane navigation map.

With reference to the development trend of unmanned land vehicles, it is foreseeable that the development continuity of unmanned ships (that is, autonomous ships) will also have the value of stable growth. The path planning of water vehicles such as ships based on inland rivers mostly relies on the captain's experience or follows a fixed route for automatic driving. The disclosure method of this embodiment can develop the optimal navigation map of the watercraft in real time via a path planning algorithm.

Traditional marine radars and nautical charts are mostly used for navigation of current water vehicles, which are costly and require a large space for equipment installation. In this embodiment, the installation equipment is relatively small, so it is easier to install on unmanned vehicles or small ships. Based on the use of the three-dimensional optical radar 120, the detection degree of low ships can be increased. The present invention should have predictable market growth.

The above-mentioned descriptions are only preferred embodiments of the present invention and are not intended to limit the scope of implementation of the present invention. Therefore, all the shapes, structures, features, and spirits described in the scope of the patent application of the present invention shall be regarded as equivalent to the changes and modifications per se, and be included in the scope of the patent application of the present invention.

What is claimed is:

1. A watercrafts environment risk real-time control and navigation system, comprising:

a processor is configured on a watercraft;

a 3-dimension (3D) radar connects with the processor, and the 3D radar scans the obstacles around the watercraft and gets a 3D point cloud in real time;

an inertial sensor connects with the processor, and the inertial sensor detects a motion of the watercraft and acquires a watercraft motion information; and a global positioning system (GPS) connects with the processor, and the GPS feedbacks a real-time coordinate of the watercraft in a plane navigation coordinate system;

wherein the processor, comprising:

a coordinate transform system stacks a projection of the 3D point cloud to form a 2-dimension (2D) point cloud, and the 2D point cloud is converted into a plane point cloud according to a real-time coordinate of the plane navigation coordinate system;

an image processing unit rasterizes the plane point cloud, and the image processing unit refers to the watercraft motion information to remove noise and optimize the obstacles via an algorithm, and the image processing unit generates a plane navigation map;

a path planning unit calculates an optimal path for the watercraft by the plane navigation map;

wherein the image processing unit comprises a filter module, and the filter module performs an erosion operation, a dilation operation, or combinations thereof;

wherein the dilation operation comprising:

a reference value is set by sea state;

a first dilation coefficient; and a second dilation coefficient;

wherein if a value of the watercraft motion information is not over the reference value, the dilation operation performs the image operation with the first dilation coefficient;

if the value of the watercraft motion information is over the reference value, the dilation operation performs the image operation with the second dilation coefficient.

2. The navigation system as claimed in claim 1, wherein the 3D radar is light detection and ranging (LiDAR) sensor.

3. The navigation system as claimed in claim 1, wherein the watercraft motion information comprises a heading and a ship motion information.

4. The navigation system as claimed in claim 1, wherein the watercraft motion information comprises at least one 2D motion information.

5. The navigation system as claimed in claim 4, wherein the 2D motion information comprises rolling, pitching, heaving, or combination thereof.

6. The navigation system as claimed in claim 1, wherein the real-time coordinate is a real-time geodetic coordinate of the watercrafts.

7. The navigation system as claimed in claim 1, wherein the path planning unit plans the optimal path by Rapidly-exploring random tree algorithm (RRT).

8. A watercrafts environment risk real-time control and navigation operation method, comprising:

a 3-dimension (3D) radar scanning obstacles around the watercraft and getting a 3D point cloud in real time;

3D point cloud projections being stacked to form a plane that forms a 2-dimension (2D) point cloud; wherein the 2D point cloud is converted into a plane point cloud in a plane navigation coordinate system according to a real-time coordinate of the watercraft from a global positioning system (GPS) feedback in the plane navigation coordinate system;

rasterizing the plane point cloud;

acquiring a watercraft motion information by an inertial sensor;

determining a dilation algorithm in an image processing unit to use a first dilation coefficient or a second dilation coefficient according to the watercraft motion information;

using the erosion algorithm and dilation algorithm to remove noise and optimizing the obstacles, and generating a plane navigation map; and calculating an optimal path for the watercraft by the plane navigation map.

* * * * *